Oct. 31, 1944.   E. D. TILLYER ET AL   2,361,514
MEANS AND METHOD OF MANUFACTURING PRISMS
Filed Jan. 2, 1942   3 Sheets-Sheet 1

EDGAR D. TILLYER
CARL G. SILVERBERG
DANIEL P. BERNHEIM
INVENTORS

BY
ATTORNEY

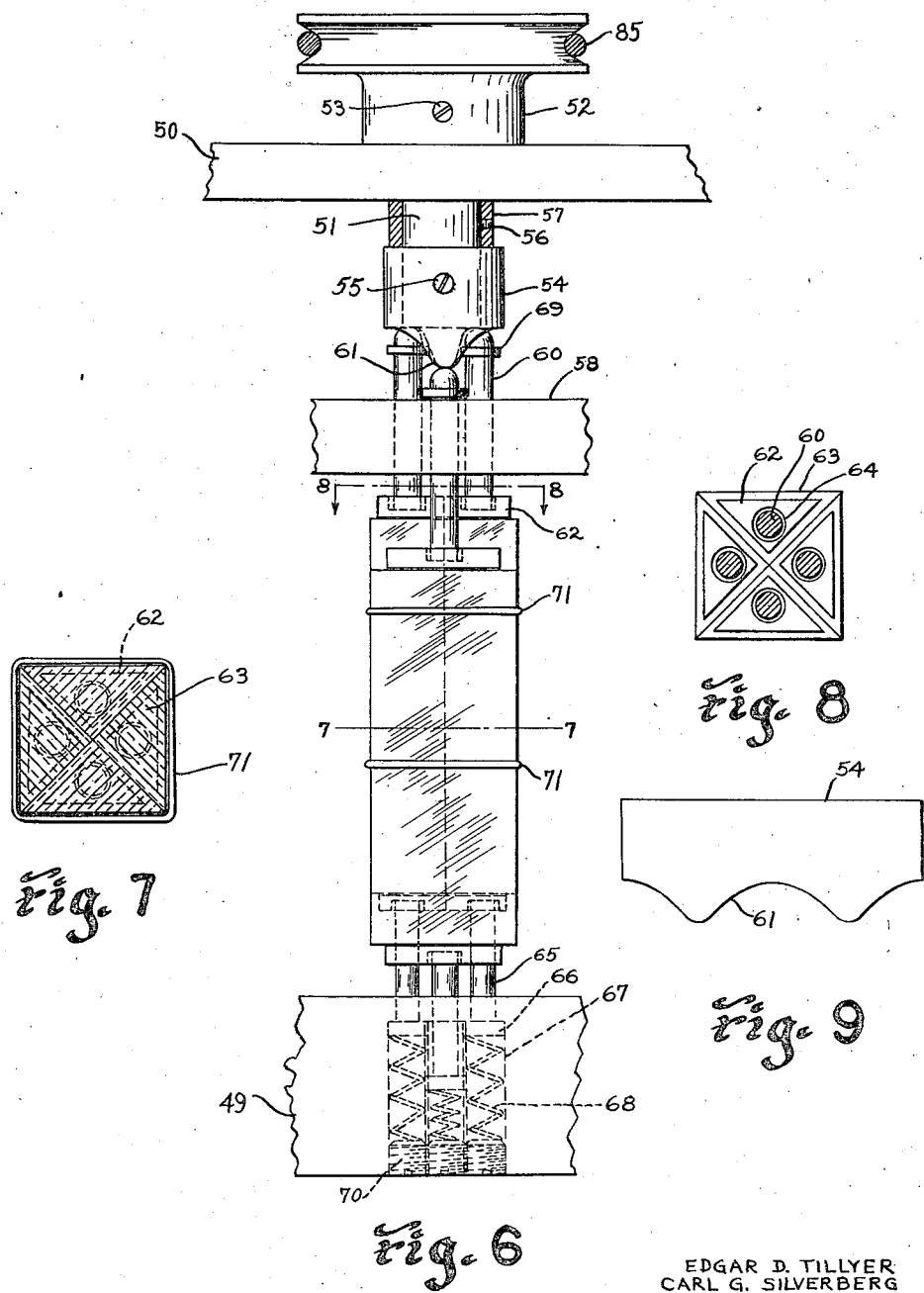

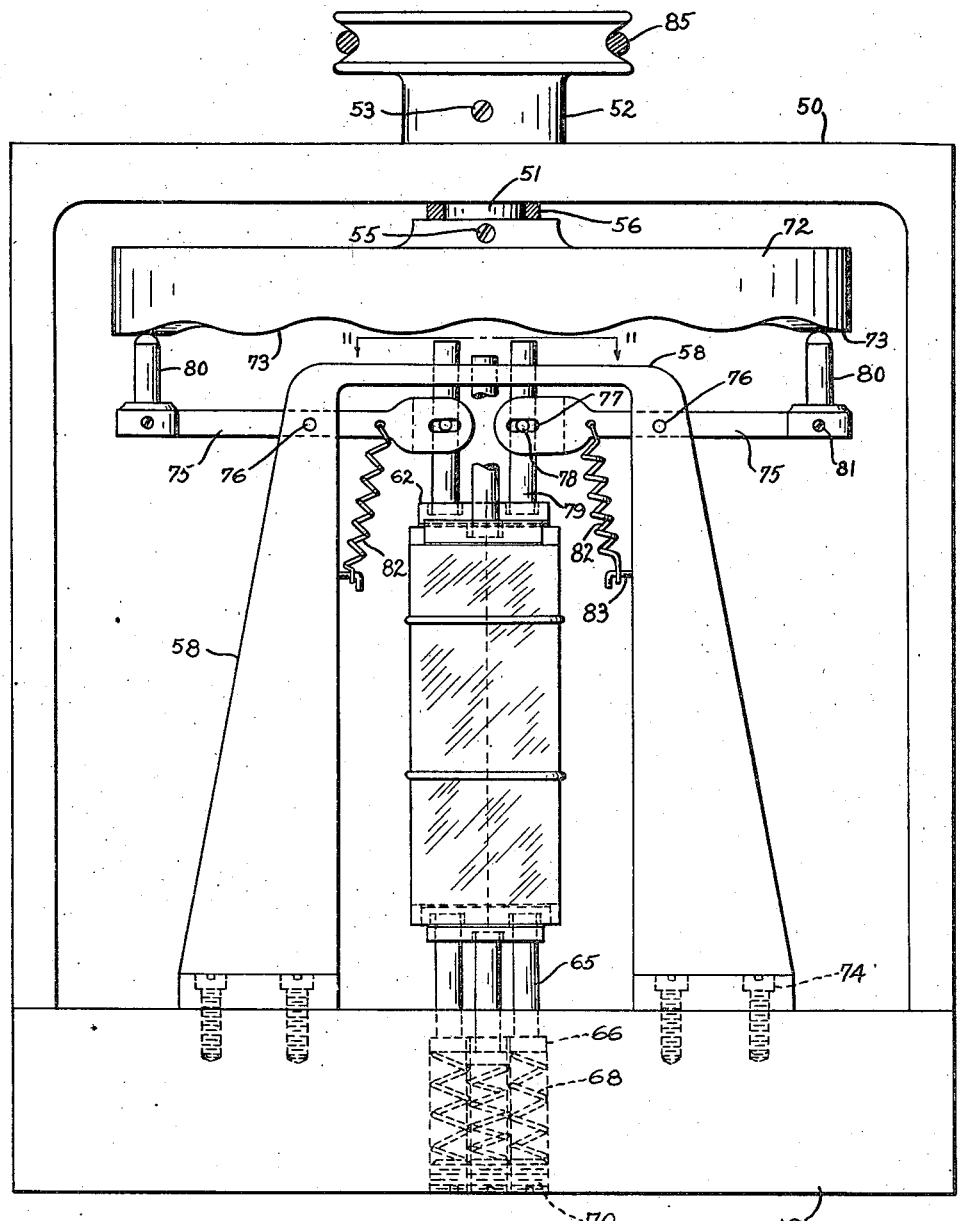
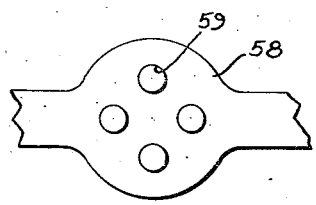
Fig. 10
Fig. 11
EDGAR D. TILLYER
CARL G. SILVERBERG
DANIEL P. BERNHEIM
INVENTORS Patented Oct. 31, 1944

2,361,514

UNITED STATES PATENT OFFICE 2,361,514

MEANS AND METHOD OF MANUFACTURING PRISMS

Edgar D. Tillyer, Carl G. Silverberg, and Daniel P. Bernheim, Southbridge, Mass., assignors to American Optical Company, Southbridge, Mass., a voluntary association of Massachusetts Application January 2, 1942, Serial No. 425,422

16 Claims. (Cl. 51—122)

The present invention pertains to a novel method and means for manufacturing prisms and more particularly refers to a novel method and means of fine-grinding and polishing prisms, particular reference to roof prisms.

Heretofore, in the manufacture of prisms, the prisms were obtained by individually treating the various faces of said prisms. This necessitated the use of very precise factors, which at best are not close enough for producing precision angles on the prisms. Therefore, it was necessary to individually polish and correct focus during polishing of the prisms which requires great skill.

The present invention contemplates the manufacture of prisms utilizing a novel method and means which does not require skilled help for the purpose of obtaining prisms with accurately related surfaces.

The present invention is for obtaining accurate 90° angles and optically flat surfaces on prisms, particularly of the roof-type, which are difficult to obtain by the old method. In carrying out the present invention, the various rough prisms may be obtained by shaping, sawing, or abrading the prism material to produce surfaces approximately in desired relation with each other by any conventional method.

According to the invention presented herein, the individual prisms are then cemented to the carrier blocks by any conventional materials which do not produce a strain in the prism. Thereafter, the prisms are processed according to the disclosure in the present invention, which processing may be done by relatively unskilled operators in accordance with the teachings of the present application and the apparatus described therein.

It is an object of the present invention to provide novel method and means for manufacturing prisms in a simplified operation.

It is a further object of the invention to provide a simplified novel means of grinding and polishing prisms wherein the simplicity of producing the prisms does not require a highly experienced operator as was the case heretofore.

A further object of the invention is to provide a novel method and means of producing prisms by simultaneously treating at least two surfaces on each of the prisms in a group of prisms.

A further object of the invention is to provide a novel simplified method and means of treating a multiplicity of prisms with at least two faces of each of said prisms being under treatment at the same time.

A further object of the invention is to provide a novel method and means of reciprocating prisms so that the surface of one prism will act as a lap for the surface of another prism.

A further object of the invention is to provide a device having a revoluble lap and means for supporting two contiguous prisms in relation to the lap for reciprocating motion thereagainst.

A further object of the invention is to provide a plurality of prisms in substantially vertical alignment and means for treating said prisms while vertically supported.

A further object of the invention is to provide a device for treating a multiplicity of contiguous prism faces by assembling the prisms for reciprocation relative to each other while under treatment.

Further and other objects of the invention may be and may become apparent to those skilled in the art, and it is intended that the present disclosure is only by way of illustration. Other changes and modifications may be made and equivalents may be employed in carrying out the invention within the spirit of the subjoined claims.

In the drawings:

Fig. 6 is a modification of the invention showing means for treating a group of four prisms in contradistinction to the treatment of the two prism groups in Figs. 1 and 2.

Fig. 7 is a sectional view taken along lines 7—7 of Fig. 6 showing a four-prism group.

Fig. 8 is a sectional view taken along lines 8—8 of Fig. 6 to show the end mounting of the four-prism group.

Fig. 9 is a plan view of a cam for reciprocating the prisms.

Fig. 10 is a modification of a device for simultaneously treating dual faces in a four-prism group.

Fig. 11 is a view taken along lines 11—11 of

Figure 1:
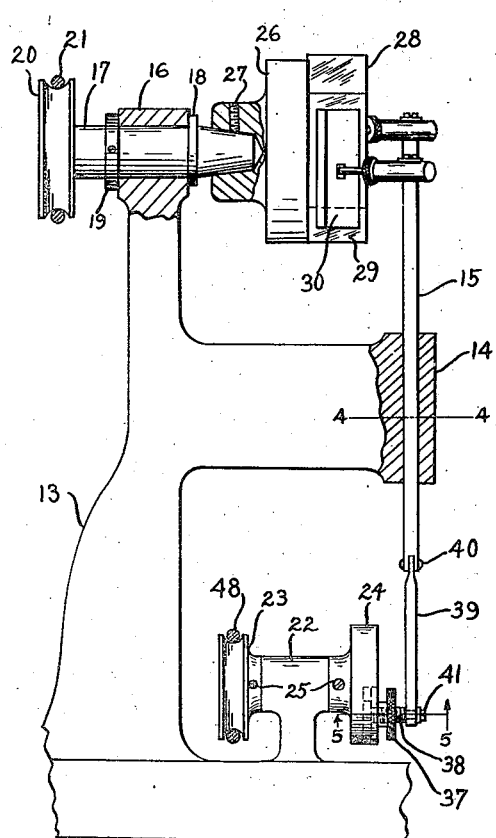
Fig. 1 is a side view of the machine with certain parts broken away showing two prisms vertically positioned against a rotatable lap.

Fig. 10 to show the guide means for aligning the prism positioning means.

It is evident that two prisms of an exact 90° angle will add together to produce an angle of 180°, which is a flat surface. If one prism is 90° 5' and the other 90° 10' and they are ground together on a flat surface, the resultant is 89° 58' and 90° 2' for the respective prisms. However, with the two prisms above we have no further means of reducing the error. However, if we add a third prism, we can by combining in pairs, continuously reduce the error since each combination in succession is reduced to a flat.

Although it is unnecessary to know the actual angles of the prisms to start with, for purpose of illustration, let us assume three prisms which have any arbitrary angles to start with as follows:

Prism A=90° 10'
Prism B=90° 5'
Prism C=89° 55'

We grind prism A with prism B on a flat rotatable lap. Therefore:

Prism A= 90° 10'
Prism B= 90° 5'
———
Prisms A and B=180° 15'

This extra 15' above the 180° must be ground off and will be roughly ground equally from each prism; say 7' from one and 8' from the other giving us a new A, known as A', of 90° 3' and a new B, known as B' of 89° 57'.

Now grind B' with C. Thus:

Prism B'= 89° 57'
Prism C= 89° 55'
———
Prisms B' and C=179° 52'

Grinding these on the flat will increase the angle of each prism by ½ of 8', or 4' giving us for our new set of prisms:

Prism A'=90° 3'
Prism B''=90° 1'
Prism C'=89° 59'

This process is repeated until the desired accuracy is obtained. The sequence is of no importance so long as it is consistently employed. At one repetition of the prism group, one prism may get worse while the other two prisms will be improved but the ultimate combination reduces the average error of each group of prisms each time.

In order to keep surfaces of prisms flat the face of the prism that is against the face of another prism one time is turned so that this face is against the flat lap later, in other words mixed up continuously.

It is lengthy to write out numerical values for more than three prisms in each successive stage but many prisms may be used with continuous random mixing or systematic mixing to insure the effect of complete mixing with continuous average approximation toward 90° for each prism although one perfect 90° prism might have its angle increased or decreased in the early stages of the mixing.

In the drawings, Figs. 1 to 5 inclusive disclose a device for fine grinding a group of three prisms as set forth in the above example. It is to be understood that this device may be used wherein a batch of prisms, greater than three, may be processed, but the procedure is substantially the same as set forth for the batch of work consisting of three prisms.

Figs. 6 to 11 inclusive are a modification of the device shown in Figs. 1 to 5 inclusive. The device presented in the modification shown in Figs. 6 to 11 inclusive, is for processing a batch of prisms wherein the batch is made up of individual groups consisting of four prisms each. The theory of thorough intermingling of the prisms between each step of processing is the same as hereinbefore described for the group of three prisms. The intermingling of the prisms during the various steps of processing may be done by a definite plan, or by random mixing. The random mixing would be used where the batch is sufficiently large to permit a successful operation of the law of averages for assurance of a sufficient intermingling of the prisms between the various steps of fine grinding.

Figure 2:
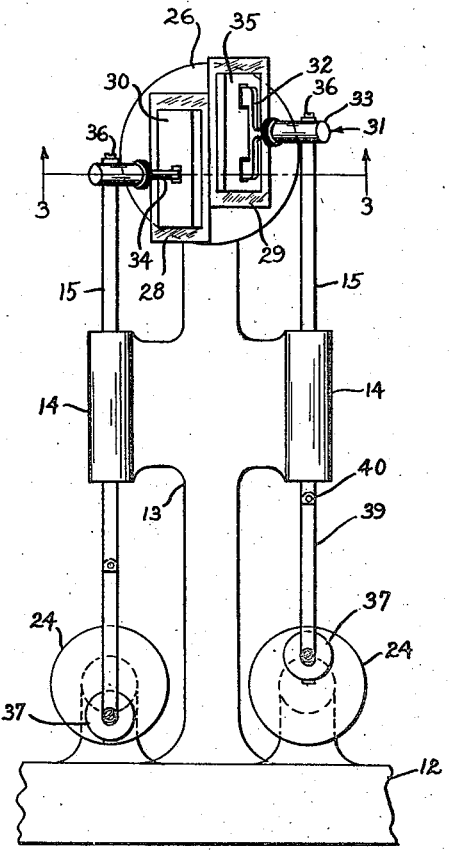
Fig. 2 is a front view of Fig. 1 showing the means for vertically reciprocating the prisms in relation to the lap.

Referring to the drawings and more particularly to Figs. 1 and 2, a base 12 has a frame 13 with a journal 14 for supporting a reciprocating rod 15. The upper portion of the frame 13 has a journal 16 which holds a lap spindle 17 rotatably positioned therein by means of collars 18 and 19 located on the spindle 17. A pulley 20 has a belt thereon for rotating said pulley, which belt is driven by any suitable motor means such as an electric motor, or may be connected to a pulley which is secured to a driven shaft. A bearing 22 is securely connected to the frame 12 and has a shaft therethrough which has a pulley 23 connected on one end thereof with an adjustment plate 24 connected on the opposite end thereof, said pulley 23 and plate 24 being secured to the shaft by means of screws 25. A lap 26 is connected to the tapered end of the spindle 17 and is secured thereon by means of a screw or other locking means 27. Prisms 28 and 29 are secured to the prism carriers 30 and 35.

The upper ends of the rods 15 have plungers 31. Plunger pins 32 and 34 are located in housings 33. Plunger pins 32 and 34 fit into the prism carriers 35 and 30 respectively, so that the prisms 28 and 29 which are secured to the prism carriers may be reciprocated by the action of the rods 15 which are connected to the plunger 31 by means of screws 36.

The plate 24 has a locking nut 37 which holds a stud 38 in position therein. A link 39 is pivotally connected to the shaft 15 by a pin 40 and to the stud 38 by means of the screw 41.

Figures 3, 4:
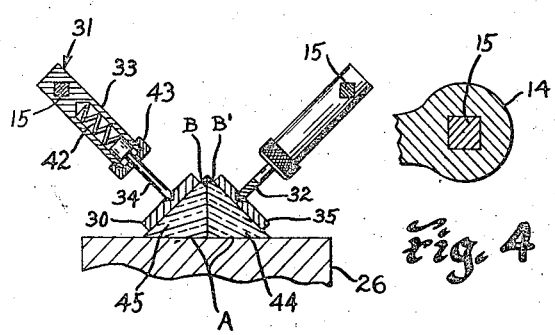
Fig. 3 is a sectional view taken substantially along lines 3—3 of Fig. 2.
Fig. 4 is a sectional view taken along lines 4—4 of Fig. 1.

Fig. 3 shows an enlarged view of the plunger 31 with the plunger pins 32 and 34 inserted within the housing 33. A spring 42 within the housing 33 is of the expansion type and urges the plunger pins 32 and 34 toward the threaded cap 43 so that the plunger pins exert pressure on the prism carriers 35 and 30 while the prism blocks are secured to the prisms 44 and 45.

The view in Fig. 4 shows the square-shaped rod 15 positioned in the journal 14 to prevent said rod 15 from rotating.

Figure 5:
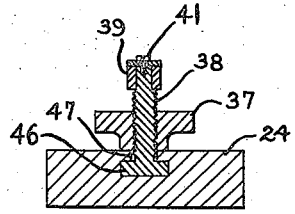
Fig. 5 is a sectional view taken along lines 5—5 of Fig. 1 showing the adjustment means for controlling the throw of the prism reciprocating means.

The enlarged view shown in Fig. 5 taken along lines 5—5 of Fig. 1 shows the plate 24 with the stud 38 having an enlarged head 46 which is slidable in the groove 47. The movement of the stud 38 along the T-shaped groove 47 will move said stud in relation to the center of the plate 24 so that the amount of throw of the link 39, and the rod 15 will control the extent of reciprocation of the prisms 44 and 45 on the lap 26.

The pulley 23 in Fig. 1 has a belt 48 which rotates the pulley 23 and the plate 24. The belt 48 may be connected to any source of rotation such as a motor or a shaft driven pulley much in the same manner as was described for rotation of the pulley 20 by the belt 21. It is to be understood that a single motor with suitable gearing may be employed to drive both of the pulleys 20 and 23.

Referring to Fig. 6, a base 49 and a top support 50 are much the same as the base and support 49 and 50 shown in Fig. 10. In the view shown in Fig. 6, the modification is for treating groups of four prisms and has a shaft 51 which has a pulley 52 secured above the top frame 50 by means of a screw 53. A cam member 54 is connected to the lower end of the shaft 51 by means of a screw 55. A collar 56 is located between the upper surface of the cam 54 and the lower surface of the top frame 50, with said collar being connected to the shaft 51 by means of a screw 57. In actual construction the collar 56 may be a spacing collar which is freely rotatable or may be in the form of a thrust bearing. Any suitable means may be provided to hold the cam member 54 in proper relation with the remainder of the machine. The top portion of a yoke 58 is much the same as the yoke 58 in Fig. 10 and has an arrangement of openings 59 in the upper portion of the yoke much the same as shown in Fig. 11. The vertically movable pins 60 pass through the holes 59 in the yoke 58 with the upper end of said pins engaging the camming surface 61 of the cam member 54 with the lower ends of the pins engaging the end blocks 62, which end blocks are cemented or otherwise fastened to the prisms 63.

Referring to Fig. 8, the end blocks 62 are triangular in shape and are substantially centrally located on the opposing ends of all the prisms in the batch. The pins 60 are shown having the flat end thereon so that they fit into a flat hole 64, which hole is located in the end block 62. The hole 64 is of greater diameter than the pin 60 so that there may be a relative side motion to permit the prisms to adjust themselves when the machine is in operation.

The base pins 65 have heads 66 thereon, which heads slide in a hole such as 67. It will be seen that the base pins 65 are smaller in diameter than the heads 66 so that the action of the springs 68 will not force the pins out of the base block 49 when the prism group is removed from the device. Small collars 69 are located on the upper pin 61 so that said pin 61 will not fall through the yoke 58 when the prism group is removed from the machine. A small screw 70 is threadedly connected to the bottom of the hole 67 in the base 49 so that the springs 68 will be retained therein, which screws 70 also act as spring tensioning means.

In blocking the prisms, both ends of the prisms, namely the upper and lower end, receive substantially the same type of end block as is shown in Fig. 8, and the means of securing all end blocks is substantially the same, it being understood that the proportional dimensions of all end blocks are substantially the same. An elastic band 71 is placed around the prism group so that the prisms are all drawn toward the center of the group. However, a spring or other suitable means may be molded for retaining the prism group with certain of their faces contiguous so that there will be a proper contacting of the prisms when the device is in operation.

Fig. 7 shows the prisms 63 held in position by the elastic band, spring, or other suitable resilient member. Any resilient member may be used that will hold the prisms in proper relation with each other. While a resilient band 71 has been shown as holding the prisms together, any other resilient mechanical means may be used so that the prisms may be held in a suitable vertical position while being permitted to have axial movement during the grinding and polishing operation.

In Fig. 9, the cam member 54 is shown with the camming surface 61 located on the underneath side. This development of the cam shown in Fig. 9 is merely representative of any suitable camming surface. The diameter, height of the teeth in the cam, the material of which the cam member is made, and the frequency of the teeth in the cam will depend upon the particular job to be handled. For example, the frequency of oscillation of the cams and the regularity of oscillation would depend upon the number of teeth and the shape of the teeth respectively, as well as on the speed of rotation of the pulley 52. Consequently, the disclosure in Fig. 6 is representative of one form of device for accomplishing the vertical reciprocation of the prisms and it is to be understood that many variables are existant depending upon the results desired.

A modification of the multi-prism processing device is shown in Fig. 10 wherein the frame 50 is securely connected to the base 49. A pulley 52 is connected to a shaft 51 and has a spacing collar 56 similar to that described for Fig. 6. A cam 72 is shown having a multiplicity of teeth 73 on the camming surface. A yoke 58 which is similar to the yoke 58 of Fig. 6 is connected to the frame 49 by screws 74. Levers 75 are pivoted to the yoke 58 by means of pins 76. The inner end of the lever 75 have slots 77 therein and slidably engage pins 78, which pins are connected to the centralizing pins 79. The outward end of the lever 75 have camming pins 80 which are secured thereto by screws 81. The top portion of the camming pins 80 engage the teeth 73 of the camming surface of the cam 72. Springs 82 are connected to the inner end of the lever 75 and the yoke 58 by means of screws 83 or other suitable connecting means. The spring 82 is a contracting spring which draws the inward ends of the lever 75 downwardly, so that the camming pin 80 in the outward end of the lever 75 will always engage the teeth 73 of the cam 72.

The base pins 65 having heads 66, which engage springs 68, are held in position by screws 70, substantially in the same manner as described in reference to Fig. 6.

A belt 85 in both Figs. 6 and 10 engage the pulley 52 and rotates the cam 72.

In operation, it will be seen that the device in Figs. 6 and 10 will be driven by a belt-operated pulley 52 to rotate the cam members 54 and 72 respectively. The rotation of the cam in Fig. 6 will cause the pins 60 to be urged downwardly, and the action of springs 68 will urge the prisms and pins 60 upwardly so that the upper ends of the pins 60 at all times engage the camming surface 61 of the cam member 54.

The operation of the device shown in Fig. 10 is somewhat similar to the operation of the device shown in Fig. 6. The springs 82, as has been previously explained, holds the camming pin 80 in constant engagement with the camming teeth 73 of the cam 72.

The tension of the spring 68 in Fig. 10 must be sufficiently strong to overcome the action of the spring 82 which draws down the lever arms. The springs 82 are of sufficient strength to keep the cam pins 80 in contact with the teeth 73 of the cam 72 so that the weight of the camming pin lever portion under the arm will prevent the centralizing pins 79 from becoming unseated with the end blocks 62.

The speed of rotation of the lap and the velocity of reciprocation of the work is variable so that optimum conditions for producing the desired results may be arrived at. In the case of grinding the two prisms against a lap as shown in Figs. 1 and 2, the lap should preferably be made of iron. In this case, the grinding and polishing would take place simultaneously on the surface A and the two surfaces B and B'.

The work is shown in a vertical position so that the excess abrasive or polishing agent may drain out from the bottom instead of accumulating at the faces B, B', and A.

In Fig. 2, the flexible coupling between the reciprocating members and the work holding device is adapted to permit the items making up the work to fit each to each without binding, whereby true surfaces may be generated. Guides to prevent rotation of the plunger pins such as 32 and 34 may be provided if necessary. However, some degree of rotation of the plunger pins 32 and 34 is permissive.

The hole 64 in the end block 62 fastened to the end of the prism is flat on the bottom, and the pin shown is also flat on the bottom, the pin being substantially smaller in diameter than the hole so that lateral thrust will be permissive but kept at a working minimum.

While mixing of prisms is the gist of the present invention, the mixing may be done according to a definite pattern as well as by random mixing so that the prisms would be interchanged recurrently according to a definite plan to assure that no two prisms would have the same faces engage each other on successive mixing. In the mixing, following the pattern mixing plan, certain of the prisms may be changed end for end while others remain in their same vertical relation during the mixing. It should be obvious that in pattern mixing any number of patterns may be used depending on the size of the groups and the size of the batch.

From the foregoing, it will be seen that the steps of the method require preshaping of the prisms with at least two adjacent faces being substantially at a ninety degree angle. A further step requires end blocking the prisms and locating them in the machines so that at least two surfaces of each prism will be treated simultaneously. The recurrent intermingling or mixing of the prisms at the end of each batch definitely assures that no two prisms will engage each other after successive mixing, particularly when a pattern intermingling or mixing is utilized. A combination of pattern and random mixing may be employed by changing certain of the prisms end for end and then intermingling at random the two sections of the batch.

In actual operation, the recurrent mixing of the batch will occur between the various steps of fine-grinding while using an abrasive having given characteristics. Thereafter, the polishing operation may ensue with a recurrent number of mixings of the prisms while in the presence of a polishing agent having different characteristics so that a polished surface may be obtained on each of the prisms at a sufficiently accurate angle. In the present type of prisms shown the accurate and critical angle of the prism is substantially ninety degrees having a small plus or minus tolerance depending upon the precision required of the prism.

While any suitable abrasive or polishing material or agent may be used, the present device is contemplated for specific use with abrasive and polishing agents of the liquid type, such as a polishing agent consisting of what is commercially known as rouge or other polishing material in the presence of water.

In referring to Figs. 1 and 2, it is to be understood that the lap 26 may be of metal or may be a glass faced lap having substantially the same co-thermal expansion as the prisms. When using the device as shown in Figs. 6 and 10 to obtain treatment of four prisms simultaneously, it is to be understood that two of the opposing prisms may be employed with two dummy-shaped prisms, which dummies may be made of any suitable material such as iron, or a metal having a glass face.

Having described our invention, we claim:

1. A device of the class described for manufacturing prisms comprising a revolvable flat disc with its flat surface vertically disposed, means for supporting two adjacent prisms with adjacent surfaces in contiguous relation with each other and with other surfaces in contiguous relation with a vertically disposed disc, an abradant between said contiguous surfaces, means for reciprocating said prism supporting means, and means for revolving said vertically disposed disc.

2. A device of the class described for manufacturing prisms comprising a framework, a revolvable flat disc with its flat surface vertically disposed mounted in said framework, means for supporting two adjacent prisms against the vertically disposed disc with said prisms having surfaces in contiguous relation with each other, abradant means on said various surfaces, means for reciprocating said prism supporting means, and means for revolving said vertically disposed disc.

3. A device of the class described for manufacturing prisms comprising a supporting structure, a disc having a vertically disposed flat surface revolvably mounted on said supporting structure, reciprocating means for disposing prisms with surfaces thereof adjacent each other and with other surfaces engaging the vertically disposed flat surface, abradant means on said surfaces, a supporting structure for the reciprocating means, and means for reciprocating said reciprocating means and for rotating said revolvable disc.

4. A device of the class described for manufacturing prisms comprising a framework consisting of a base having a supporting structure thereon, resilient means for vertically disposing a plurality of adjacent prisms in surface to surface relation with each other on said framework, abradant means on said surfaces, camming means for reciprocating said resilient means, and means for rotating said camming means to provide a reciprocating motion of the resilient means.

5. A device of the class described for processing prisms, comprising a framework consisting of a base having a supporting structure thereon, resilient means supported by said framework for vertically disposing a plurality of prisms in surface to surface relation with each other, said resilient means comprising means for supporting the bottom of the prisms and means for supporting the top of the prisms, both of last said means cooperating to maintain substantial vertical alignment of the prisms, abradant means on said prism surfaces, camming means for reciprocating said resilient means, and means for imparting movement to said camming means and said resilient means.

6. The method of processing prisms comprising the step of supporting two prisms in a vertical position with a face of each of said prisms contiguous with each other, and with a different face of each prism contiguous with a vertically disposed face of a metallic disc, imparting rotary movement to the vertically disposed metallic disc, and a further step of reciprocating the prisms in the presence of an abrading agent.

7. The method of processing prisms comprising supporting three or more prisms in vertical relation with two of the faces of one prism being in physical contact with at least one face of each of the other prisms, vertically reciprocating at least one of said prisms and applying a liquid processing agent to the faces of the prisms under treatment.

8. The process of surfacing prisms comprising placing two or more prisms in contiguous vertical relation with one another, reciprocating said prisms in the presence of a liquid abradant, continuing the aforementioned steps with various groups of different prisms until a complete batch of prisms have been surfaced, thoroughly mixing the prisms and again placing them in groups so that no two prisms in any one group will have their same faces in contact with each other in the same position as when previously treated, subjecting the various groups of the prisms in the batch to a second surfacing operation until all the prisms in the batch have been surfaced a second time, and repeating the mixing and surfacing of the batch of prisms until all of the prisms in the batch approach an approximate ninety-degree angle between two adjacent faces.

9. The process of surfacing prisms comprising placing two or more prisms in contiguous relation with one another, reciprocating said prisms in the presence of a liquid abradant, continuing the aforementioned steps with various groups of different prisms until a complete batch of prisms have been surfaced, regrouping the various prisms in the batch by mixing the prisms at random sufficiently to limit the recurrence of two prisms in any one group from having their same faces in contact with each other in the same position as when previously treated, subjecting the various groups of the prisms in the batch to a second surfacing operation until all the prisms in the batch have been surfaced a second time, and repeating the mixing and surfacing of the batch of prisms until all of the prisms in the batch approach an approximate ninety-degree angle between two adjacent faces.

10. The process of surfacing prisms comprising placing at least two prisms in contiguous relation with one another, reciprocating said prisms in the presence of a liquid abradant, continuing the aforementioned steps with various groups of different prisms until a complete batch of prisms have been surfaced, regrouping the various prisms in the batch by mixing the prisms according to a specific pattern to prevent the recurrence of two prisms in any one group from having their same faces in contact with each other in the same position as when previously treated, subjecting the various groups of the prisms in the batch to a second surfacing operation until all the prisms in the batch have been surfaced a second time, and repeating the mixing and surfacing of the batch of prisms until all of the prisms in the batch approach an approximate ninety-degree angle between two adjacent faces.

11. The process of surfacing prisms comprising placing at least two prisms and an element simulating a prism in contiguous relation with one another, reciprocating said prisms and said simulated prism element in the presence of a liquid abradant, continuing the aforementioned steps with various groups of different prisms and a prism simulated element until a complete batch of prisms have been surfaced, regrouping the various prisms and simulated prism elements in the batch by mixing the prisms and simulated elements to restrict the recurrence of two prisms in any one group from having their same faces in contact with each other in the same position as when previously treated, subjecting the various groups of the prisms in the batch to a second surfacing operation until all the prisms in the batch have been surfaced a second time, and repeating the mixing and surfacing of the batch of prisms until all of the prisms in the batch approach an approximate ninety-degree angle between two adjacent faces.

12. A device of the class described for manufacturing prisms comprising a framework, a revolvable flat disc with its flat surface vertically disposed mounted on said framework, means for supporting two adjacent prisms in surface to surface relation with each other and each with a surface against the vertically disposed disc, abradant means on said surfaces, means for reciprocating said prism supporting means, means for revolving said vertically disposed disc, and means for restricting the rotational movement of the prism supporting means when the device is in operation.

13. A device of the character described comprising means for supporting a plurality of prism-like members in adjacent relation with each other with at least two of said prism-like members having contiguous surfaces in engagement with each other and in such a manner that said prism-like members will be free for self-positioning relative to each other and means for moving said prism-like members relative to each other with an abradant on said contiguous surfaces to bring about an abrading action therebetween.

14. A device of the character described comprising means for relatively loosely supporting a plurality of prism-like members in adjacent relation with each other with at least two of said prism-like members having contiguous surfaces in engagement with each other, said prism-like members each having a surface disposed in substantially normal relation with the contiguous surfaces, means engaging said substantially normally disposed surfaces having abrasive means thereon and means for moving said prism-like members relative to each other with said contiguous surfaces having an abradant therebetween and with the substantially normally disposed surfaces thereof maintained in abrading contact with the means in engagement therewith.

15. The method of processing prism-like members comprising relatively loosely supporting a plurality of said members in adjacent relation with each other with at least two of said members having contiguous surfaces in engagement with each other and with substantially normally disposed surfaces in engagement with means for effecting an abrading action thereon, applying means to the engaged surfaces of said prism-like members for introducing an abrading action and moving said prism-like members relative to each other while in this relation to effect said abrading.

16. A device of the class described for abrading articles having flat surfaces angularly disposed relative to each other, a surface of one of said articles being in contiguous relation with a surface of another of said articles, each of said articles having an additional surface in engagement with a surface having abradant means thereon, abradant means between the contiguous surfaces of said articles, and means for reciprocating at least one of said articles relative to the other.

EDGAR D. TILLYER.
CARL G. SILVERBERG.
DANIEL P. BERNHEIM.